(No Model.)
C. W. SMITH.
SURFACE GAGE.
No. 259,596. Patented June 13, 1882.
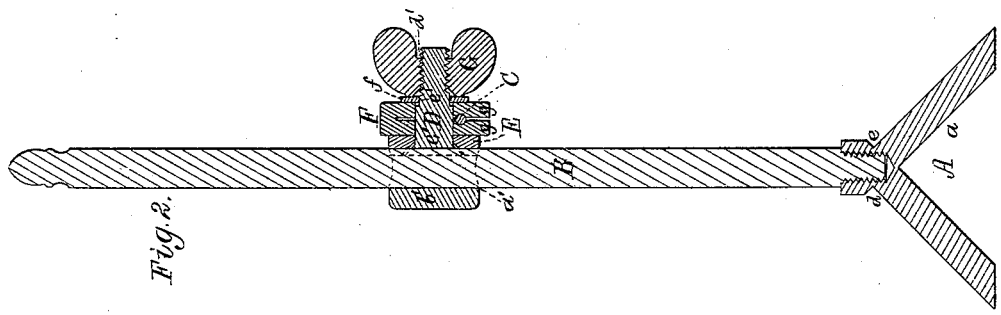
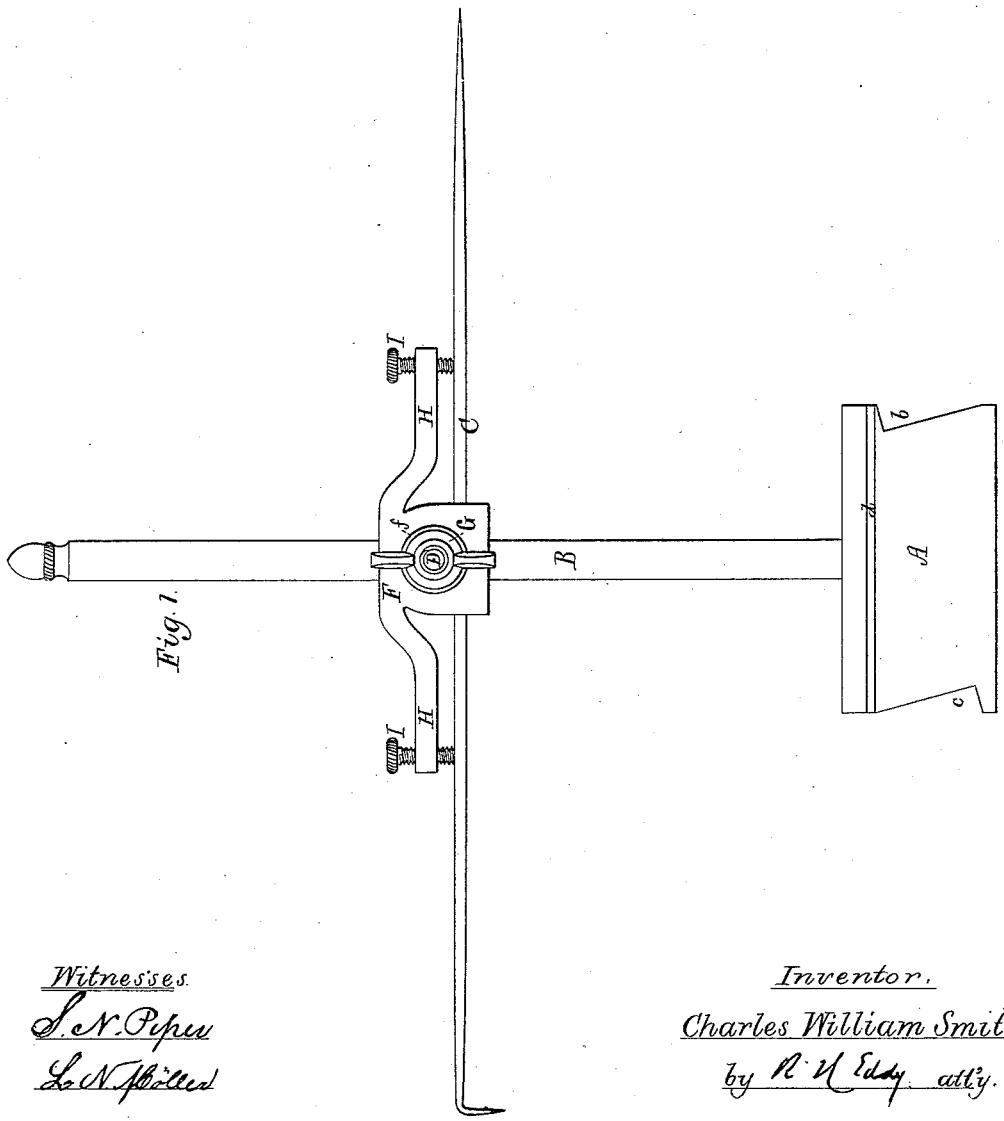
Witnesses
S. N. Piper
L. N. Miller
Inventor,
Charles William Smith
by R. H. Eddy, att'y.

UNITED STATES PATENT OFFICE.

CHARLES W. SMITH, OF HYDE PARK, MASSACHUSETTS.

SURFACE-GAGE.

SPECIFICATION forming part of Letters Patent No. 259,596, dated June 13, 1882.

Application filed January 3, 1882. (No model.)

*To all whom it may concern:*

Be it known that I, CHARLES WILLIAM SMITH, a subject of the Queen of Great Britain, and a resident of Hyde Park, of the county of Norfolk and State of Massachusetts, have invented a new and useful Improvement in Surface-Gages; and I do hereby declare the same to be described in the following specification and represented in the accompanying drawings, of which—

Figure 1 is a side elevation, and Fig. 2 a transverse section, of a surface-gage provided with my invention, the nature of which is defined in the claims hereinafter presented.

In such drawings, A denotes the base, B the post, and C the adjustable needle, of the gage. The base A, I construct with right-angular notches $a\ b\ c\ d\ e$, arranged within it in manner as represented, such being very convenient for supporting the base against the straight angular edge of a bar or plate. In order to do this the base is to be applied to the bar or plate so as to have the two edges thereof at a right angle to each other within the notch and to bear closely against its edges. This having been done and the needle adjusted as may be required, the gage may be transferred and in a like manner adapted to the corresponding edges of an article in which it may be desirable to determine the position of the point corresponding to that to which the needle may have been previously adjusted. By having the auxiliary notches in the ends as well as in the sides of the base the instrument can be advantageously used in cases where it could not otherwise be employed.

A screw-bolt, D, adapted to slide on the post B, lengthwise thereof, (the said post going through a hole, $a'$, made mostly in the head $b'$ and partly in the shank $c'$ of the bolt,) has a cylindrical shank, except at $e'$, where next the screw $d'$ of the bolt, the part $e'$ of the shank is polygonal to receive upon it a washer, $f$, whose eye is correspondingly polygonal, in order to prevent the washer from revolving upon the bolt.

A clamping-washer, E, is placed on the bolt-shank concentrically thereof and against the post. Next to such washer, and between it and the washer $f$, there is placed on the bolt-shank, so as to be capable of being turned thereon, the jawed carrier F of the needle. This carrier is split or sawed from its lower edge upward nearly to its top, and is bored lengthwise through the slit or kerf in order to receive and support the needle, the parts $g\ g$, between which the said needle is placed, constituting jaws to hold it firmly when compressed upon it by the action of a nut, G, screwed upon the screw of the bolt D.

By screwing up the nut against the washer $f$, so as to crowd it against the needle-carrier and the latter against the washer E, not only will the bolt be clamped to the post, but the needle will be clamped in and by the carrier, the latter at the same time being clamped on the bolt.

From the needle-carrier two arms, H, extend in opposite directions over the needle, in manner as represented, each arm having screwed into and through it near its outer end a screw, I, to bear against the needle. By such screw the needle may be sprung down a little in order to effect accurate adjustment of its end to a point or surface.

The washer $f$, adapted to the shank of the bolt, so as to be incapable of revolving thereon, serves to prevent the needle-carrier, while being turned on the said shank, from back-turning the nut on its screw, and thereby loosening the frictional hold of the jaws on the needle, and also that of the washer E on the post.

This surface-gage is to be used in manner and for the purpose generally as other like gages are employed by mechanics, it being simplified in its construction in comparison with various others of like character.

In the described surface-gage I claim as my invention as follows, viz:

1. The base A, provided with the right-angular notch $a$, arranged in it as represented.

2. The base A, provided with the right-angular notches $a\ b\ c$, arranged in it in manner as represented.

3. The base A, provided with the external right-angular notches, $a\ d\ e$, arranged as represented.

4. The base A, provided with the right-angle notches $a, b, c, d$, and $e$, arranged in it in manner as represented.

5. The revoluble needle-carrier F, having jaws and one or more arms, H, and screws I thereto, to operate with the needle as explained.

CHARLES WILLIAM SMITH.

Witnesses:
R. H. EDDY,
E. B. PRATT.